United States Patent [19]

Nakayama et al.

[11] Patent Number: 4,807,966

[45] Date of Patent: Feb. 28, 1989

[54] SIGHTING APPARATUS

[75] Inventors: Yasuyuki Nakayama; Tomoya Sada, both of Chofu, Japan

[73] Assignee: Mizoguchi Manufacturing Co., Ltd., Aichi, Japan

[21] Appl. No.: 133,276

[22] Filed: Dec. 15, 1987

[30] Foreign Application Priority Data

Dec. 18, 1986 [JP] Japan ................................ 61-195121

[51] Int. Cl.[4] ................................................ G02B 7/08

[52] U.S. Cl. .................................... 350/255; 356/138; 356/153

[58] Field of Search ................. 350/255; 219/121 LU; 356/138, 150, 151, 153

[56] References Cited

U.S. PATENT DOCUMENTS

| | | | |
|---|---|---|---|
| 1,498,177 | 6/1924 | Leonard | 350/255 |
| 2,592,941 | 4/1952 | Moore . | |
| 3,863,067 | 1/1975 | Gooley . | |
| 4,265,027 | 5/1981 | Burniski . | |
| 4,333,242 | 6/1982 | Genho, Sr. | 356/138 |
| 4,590,680 | 5/1986 | Hanchett et al. . | |
| 4,720,920 | 1/1988 | Tudek . | |

FOREIGN PATENT DOCUMENTS

| | | | |
|---|---|---|---|
| 223186 | 12/1984 | Japan | 219/121 LU |
| 88930 | 5/1985 | Japan | 350/255 |
| 215913 | 9/1986 | Japan | 350/252 |
| 215914 | 9/1986 | Japan | 350/252 |

*Primary Examiner*—John K. Corbin
*Assistant Examiner*—Martin Lerner
*Attorney, Agent, or Firm*—Parkhurst, Oliff & Berridge

[57] ABSTRACT

A sighting apparatus in which a laser oscillator and an optical system are provided on a rotational table and in which the laser beam is emitted in any horizontal direction by remote control. A movement conversion mechanism which converts a rotational movement to a linear movement, and a drive unit which comprises a motor operated by remote control and a reduction gear mechanism which transmits the rotation of the motor to the movement conversion mechanism are provided on the table. The movement conversion mechanism is connected to a movable mirror cylinder which holds a focusing lens constituting a part of the optical system to move the focusing lens by remote control.

1 Claim, 3 Drawing Sheets

SIGHTING APPARATUS

BACKGROUND OF THE INVENTION

1. Field of the Invention

This invention relates to an sighting apparatus using a laser beam, and more particularly to such apparatus which is capable of emitting a laser beam in any horizontal direction by remote control.

2. Description of the Prior Art

A sighting apparatus of this kind is already disclosed in the Japanese Patent Application Laid-Open Nos. 215913/1986 and 215914/1986. This apparatus includes a rotatable table supported on a base, a laser oscillator and an optical system which guides the laser beams emitted from the laser oscillator in the horizontal direction whereby the table is rotated by remote control. Even a sole user can perform a survey using this apparatus, so that the use of this apparatus has spread.

As shown in FIG. 5, the optical system includes a collection lens 3 which collects the laser beams 2 emitted from the laser oscillator 1, an automatic correction mechanism 4 which corrects the laser beams passing through the collection lens 3 so as to emit horizontally, an objective 5 which images the laser beams from correction mechanism 4 onto an object as a reference point or line, and a focusing lens 6 which is disposed movably in the direction of the optical axis between the correction mechanism 4 and the objective 5. The automatic correction mechanism 4 has a function of guiding the laser beams horizontally at all times and includes three mirrors which comprise two normally fixed tilt mirrors **4*a* and 4*b* and a single flat plate-like mirror 4*c*** suspended by a thread.

In the conventional sighting apparatus, a movable mirror cylinder which holds the focusing lens 6 is usually mounted slidably within a fixed mirror cylinder which holds the objective 5. The movable mirror cylinder is manually moved relying upon scales marked between both the mirror cylinders to perform focusing. Therefore, there is the problem that if the distance determination is performed erroneously, the area of the reference point or line focused onto the object would be increased to thereby render it difficult to find a correct reference. In order to solve this problem, the user must return to the place where the sighting apparatus is installed to troublesomely rearrange the movable mirror cylinder. Thus the solution of this problem is desired.

SUMMARY OF THE INVENTION

This invention is intended to solve the above problems. The object of this invention is to provide a sighting apparatus which is capable of moving a movable mirror cylinder which holds the focusing lens by remote control to thereby improve the focusing operation.

This invention is intended to solve the above problems and characterized by a movement conversion mechanism for converting a rotational movement to a linear movement and a drive unit comprising a motor operated by remote control and a reduction gear mechanism which transmits the rotation of the motor to the movement conversion mechanism, both being provided on a table on which an optical system comprising an automatic correction mechanism is provided, the movement conversion mechanism being connected to a movable mirror cylinder which holds a focusing lens constituting a part of the optical system to thereby apply a linear movement to the movable mirror cylinder.

In this invention, the movement conversion mechanism may includes, for example, a ball screw mechanism or a rack and pinion mechanism.

In the sighting apparatus, the movable mirror cylinder which holds the focusing lens can automatically be moved by operating the motor by remote control, so that the user can perform ideal focusing while viewing the focused image directly. In this case, the rotation of the motor is transmitted to the movable mirror cylinder via the reduction gear mechanism, so that the movement of the movable mirror cylinder at the beginning and end of the operation is performed smoothly to improve the focusing operation.

DETAILED DESCRIPTION OF THE INVENTION

An embodiment of this invention will now be described with reference to the accompanying drawings.

Figure 1:
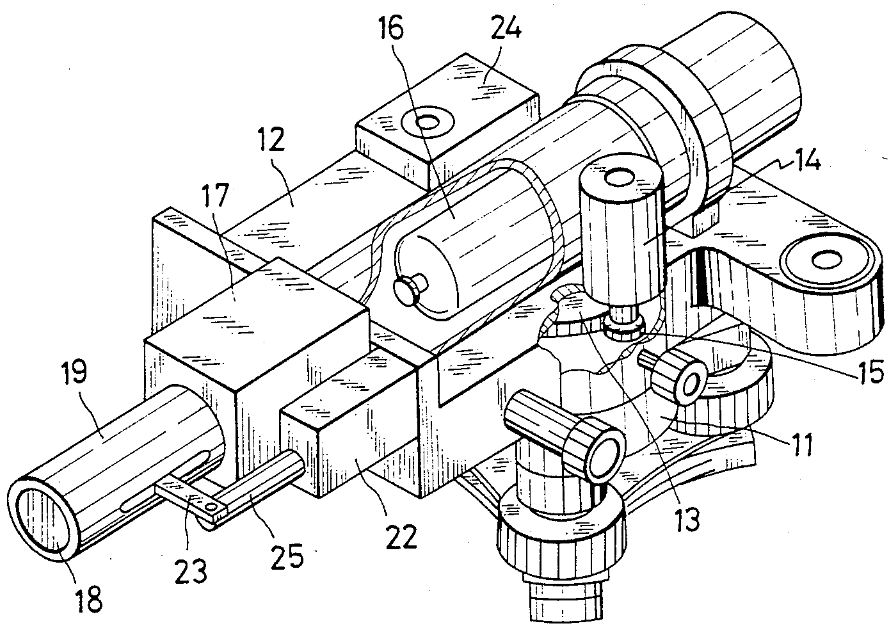
FIG. 1 is a perspective view of a sighting apparatus according to this invention.
Figure 2:
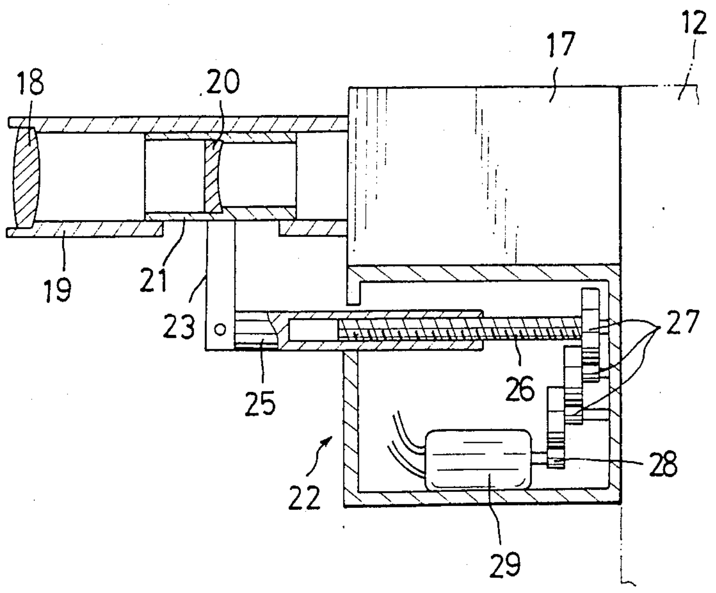
FIG. 2 is a cross-section view of a drive unit for a focusing lens.
Figure 5:
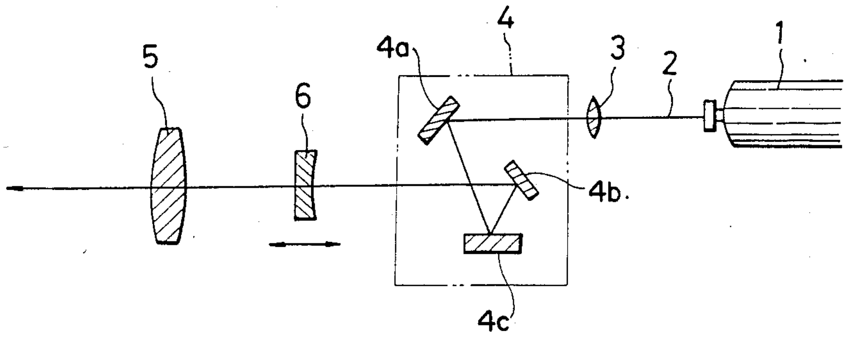
FIG. 5 is a layout of a basic optical system of the sighting apparatus.

In FIGS. 1 and 2, reference numeral 11 denotes a base on which a table 12 is supported rotatably using a vertical shaft (not shown). Provided on the base 11 is a follower gear 13 integrally with the vertical shaft with same as the center. Provided fixedly on the table 12 is a motor 14, the output shaft of which has at its end a drive gear 15 meshing with the follower gear 13 so that the table 12 can rotate by the rotation of the motor 14. Reference numeral 16 denotes a laser oscillator fixed to the table 12. A casing 17 which contains an automatic correction mechanism (FIG. 5) similar to that mentioned above, and a fixed mirror cylinder 19 which holds an objective 18 are successively disposed on the table 12 in the direction of emission of the laser beams. The fixed mirror cylinder 19 contains a slidable mirror cylinder 21 which holds a focusing lens 20 and a drive unit 22, to be described later, fixed on the table 12 is connected via a connection arm 23 to the mirror cylinder 21 such that the mirror cylinder 21 moves along the optical axis by the operation of the drive unit 22.

Disposed on the table 12 is a casing 24 which contains a safeguard unit (to be described later) which operates when the automatic correction mechanism exceeds an allowable operation range. The sighting apparatus includes a circuit which performs remote control of the motor 14 and an adjusting unit which rotates the motor 14 in the direction in which the drive gear 15 moves away from the follower gear 13. The motor 14 can be moved away from base 11 by the operation of the adjusting unit so that the table 12 can be rotated manually. The sighting apparatus further includes a level which levels the entire apparatus when installed.

As shown in detail in FIG. 2, the drive unit 22 includes a female member 25 fixed at one end to the connection arm 23, a ball screw 26 turned threadedly into the female member 25, a reduction gear train 27 which supports the ball screw 26, and a motor 29 which has an output shaft, to an end of which is attached a gear 28 meshing with the reduction gear train 27. The motor 29 is rotatable by remote control. If the motor 29 is rotated by remote control, the rotation of the motor is transmitted via the gear 28 and reduction gear train 27 to the ball screw 26. As a result, the female member 25 moves along the ball screw 26 to move the movable mirror cylinder 21 through the inside of the fixed mirror cylinder 19.

Figure 3:
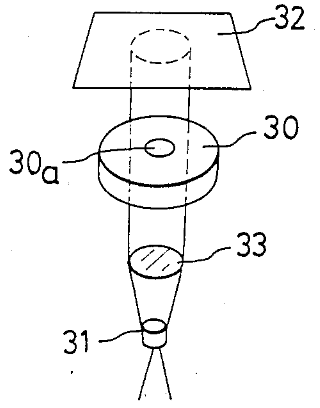
FIG. 3 is a schematic view of a sensor constituting a part of a safeguard unit.
Figure 4:
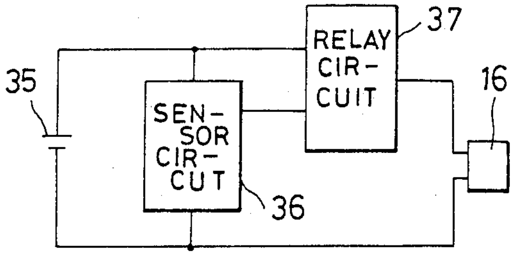
FIG. 4 is a diagram of an interrupter circuit for the safeguard unit.

The safeguard unit contained in the casing 24 includes a sensor which senses the magnification of the tilt of the table 12 and an interrupter circuit which operates to interrupt a power source circuit for the laser oscillator 16 in response to the signal from the sensor. As shown in FIG. 3, the sensor includes a circular air bubble tube 30, a light emitting element 31 and a photoelectric conversion element 32 disposed respectively above and below the tube 30, and a collimator 23 which converts to parallel light the rays of light from light emitting element 31 disposed between the tube 30 and element 31. The element 32 includes, for example, a CCD image sensor which senses quantitatively the position of an air bubble **30*a* in the tube 30 projected onto this sensor. Therefore, if the circular air bubble tube 30 is disposed so that the air bubble 30*a* is positioned at the center of the tube when the table 12 is in a horizontal state, a tilt of the table 12 in any direction can be sensed. As shown in FIG. 4, the interrupter circuit includes a sensor circuit 36 interposed in the circuit connecting the oscillator 16 and a power source therefor, and a relay circuit 37 for the sensor circuit 36. The sensor circuit 36 is constructed by the photoelectric conversion element 32 itself. When the position of the air bubble 30*a* projected onto the photoelectric conversion element 32 is out of a predetermined range (an allowable operation range of the automatic correction mechanism), the relay circuit operates to interrupt the supply of electric power to the laser oscillator 16**.

First, the sighting apparatus is installed in place by roughly ascertaining the horizontal state of the apparatus using a level (not shown), and the table 12 is then rotated to position the fixed mirror cylinder 19 so that same substantially faces an object. When the user has finished this preparation, he leaves the sighting apparatus, goes to the object and rotates the motor 14 and hence the table 12 by remote control such that the laser beams from the laser oscillator 16 are irradiated onto a predetermined position on the subject. Thereafter, he rotates the motor 29 forwardly and backwardly by remote control. The rotation of the motor 29 is transmitted via gear 28 and reduction gear train 27 to the ball screw 26. As a result the female member 25 moves along the ball screw 26, so that the movable mirror cylinder 21, namely, the focusing lens 20, moves linearly to change the area of the reference point or line focused onto the object. When the minimum reference point or line is obtained while the focused image is directly being observed, the user stops the remote control and performs a survey thereafter.

When the table 12 is tilted due to vibrations, collision with foreign substance, or for some other reason during remote control, and the tilt angle is small, the automatic correction mechanism operates to automatically correct the laser beam from the laser oscillator 16 so as to be oriented horizontally. When the tilt angle of the table is out of an allowable operation range of the correction mechanism 17, a change in the position of the air bubble **30*a* in the tube 30 is sensed by a photoelectric conversion element 32 (FIG. 3) in the safeguard unit 24. As a result, the relay circuit 37 of the interrupter circuit (FIG. 4) operates to interrupt a power supply to the laser oscillator 16**. By the stoppage of the laser beam emission, the user can recognize the trouble in advance to prevent erroneous survey.

What is claimed is:

1. A sighting apparatus comprising a table supported rotatably on a base, a laser oscillator and an optical system mounted on the table, the table being rotated by remote control, a movement conversion mechanism for converting a rotational movement to a linear movement, a drive unit including a motor operated by remote control and a reduction gear mechanism for transmitting the rotation of the motor to the movement conversion mechanism, the movement conversion mechanism and drive unit being provided on the table, the movement conversion mechanism being connected to a movable mirror cylinder for holding a focusing lens constituting part of the optical system to thereby apply a linear movement to the movable mirror cylinder, the movement conversion mechanism including a ball screw mechanism.

* * * * *